US012735306B2

(12) United States Patent
Iwamoto et al.

(10) Patent No.: US 12,735,306 B2
(45) Date of Patent: Sep. 15, 2026

(54) CONVEYANCE SYSTEM

(71) Applicant: TOYOTA JIDOSHA KABUSHIKI KAISHA, Toyota (JP)

(72) Inventors: Kunihiro Iwamoto, Nagakute (JP); Hirotaka Komura, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 312 days.

(21) Appl. No.: 18/592,884

(22) Filed: Mar. 1, 2024

(65) Prior Publication Data

US 2024/0351839 A1 Oct. 24, 2024

(30) Foreign Application Priority Data

Apr. 18, 2023 (JP) ................................ 2023-067762

(51) Int. Cl.
*B66F 9/08* (2006.01)

(52) U.S. Cl.
CPC .................................... *B66F 9/08* (2013.01)

(58) Field of Classification Search
CPC .......... B66F 9/08; B66F 9/065; B66F 9/0755; B66F 9/141; B66F 9/122; B66F 9/07559; B66F 7/28; B65G 1/0435; B65G 1/0428; B65G 2201/0235
See application file for complete search history.

(56) References Cited

U.S. PATENT DOCUMENTS

| | | | | |
|---|---|---|---|---|
| 5,304,751 | A * | 4/1994 | Skalski | B66B 1/44 187/409 |
| 10,065,798 | B2 * | 9/2018 | Borders | B65G 65/00 |
| 10,472,172 | B2 * | 11/2019 | Goren | B65G 1/1378 |
| 11,254,504 | B2 * | 2/2022 | Stevens | B65G 1/1375 |
| 12,030,762 | B2 * | 7/2024 | Picha | B66F 7/025 |
| 12,054,359 | B1 * | 8/2024 | Hubbard | B66B 1/3492 |
| D1,058,626 | S * | 1/2025 | Jiang | D15/199 |
| 2008/0056867 | A1 * | 3/2008 | Zuckerman | B66F 9/141 414/458 |
| 2014/0180469 | A1 * | 6/2014 | Flitsch | H10P 72/0458 700/218 |
| 2018/0305122 | A1 * | 10/2018 | Moulin | B65G 1/0485 |
| 2019/0352092 | A1 * | 11/2019 | Zheng | B65G 1/0421 |

(Continued)

FOREIGN PATENT DOCUMENTS

| | | | | |
|---|---|---|---|---|
| CN | 115258489 A | * 11/2022 | B65G 1/0492 |
| JP | H0323185 A | * 1/1991 | |

(Continued)

*Primary Examiner* — Saul Rodriguez
*Assistant Examiner* — Jaimin G Patel
(74) *Attorney, Agent, or Firm* — Oliff PLC

(57) ABSTRACT

A conveyance system which improves the stability of a mounting base raised and lowered along a guide rail is achieved. A conveyance system according to an embodiment of the present disclosure includes a mounting base with a groove guided along a guide rail extending in a vertical direction and a lifting mechanism configured to raise and lower the mounting base. When a direction of a movement of an item to be carried out from the mounting base is defined as a forward direction and a direction opposite to the forward direction is defined as a rearward direction, the conveyance system raises and lowers the mounting base while pressing a side surface on a rear side of the groove against the guide rail.

4 Claims, 6 Drawing Sheets

(56) References Cited

U.S. PATENT DOCUMENTS

| | | | | |
|---|---|---|---|---|
| 2020/0339350 | A1* | 10/2020 | Dooley | B65G 65/02 |
| 2022/0267091 | A1* | 8/2022 | Ota | B66F 9/0755 |
| 2025/0197116 | A1* | 6/2025 | Ning | B65G 1/065 |
| 2025/0320095 | A1* | 10/2025 | Yang | B66F 9/148 |
| 2026/0042649 | A1* | 2/2026 | Oda | B66F 9/063 |

FOREIGN PATENT DOCUMENTS

| | | | |
|---|---|---|---|
| JP | 2003-118811 | A | 4/2003 |
| JP | 5912459 | B2 | 4/2016 |
| JP | 6651963 | B2 | 2/2020 |
| JP | 2022-127887 | A | 9/2022 |

* cited by examiner

CONVEYANCE SYSTEM

CROSS REFERENCE TO RELATED APPLICATIONS

This application is based upon and claims the benefit of priority from Japanese patent application No. 2023-067762, filed on Apr. 18, 2023, the disclosure of which is incorporated herein in its entirety by reference.

BACKGROUND

The present disclosure relates to a conveyance system.

Japanese Patent No. 5912459 discloses a technique for easily adjusting a height of a workpiece on a conveyance carriage. The conveyance carriage disclosed in Japanese Patent No. 5912459 has a carriage body equipped with a traveling mechanism, a mounting part on which the workpiece is mounted, an elevating cylinder which biases the mounting part upward with respect to the carriage body in a liftable manner, and an engaging part (elevating guide roller) attached to the mounting part. An elevating guide rail having an inclined region is provided on the upstream side in the traveling direction of the conveyance carriage. The conveyance carriage can be disposed at a height where the workpiece can be carried in and out by engaging the engaging part with the inclined region of the elevating guide rail and elevating the mounting part while traveling.

SUMMARY

According to the technique described in Japanese Patent No. 5912459, when a mounting base is raised or lowered, a moment centered on a proximal end of the elevating cylinder may be generated, causing the mounting base to vibrate.

The present disclosure has been made in view of such problem, and achieves a conveyance system which improves the stability of a mounting base raised and lowered along a guide rail.

In an aspect of the present disclosure, a conveyance system includes:

- a mounting base with a groove guided along a guide rail extending in a vertical direction; and
- a lifting mechanism configured to raise and lower the mounting base, wherein when a direction of a movement of an item to be carried out from the mounting base is defined as a forward direction and a direction opposite to the forward direction is defined as a rearward direction, the mounting base is raised and lowered while pressing a side surface on a rear side of the groove against the guide rail.

According to the present disclosure, it is possible to achieve a conveyance system which improves the stability of a mounting base raised and lowered along a guide rail.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Hereinafter, a specific embodiment to which the present disclosure is applied will be described in detail with reference to the drawings. However, the present disclosure is not limited to the following embodiments. In addition, for clarity of explanation, the following description and drawings are simplified as appropriate.

First Embodiment

Figure 1:
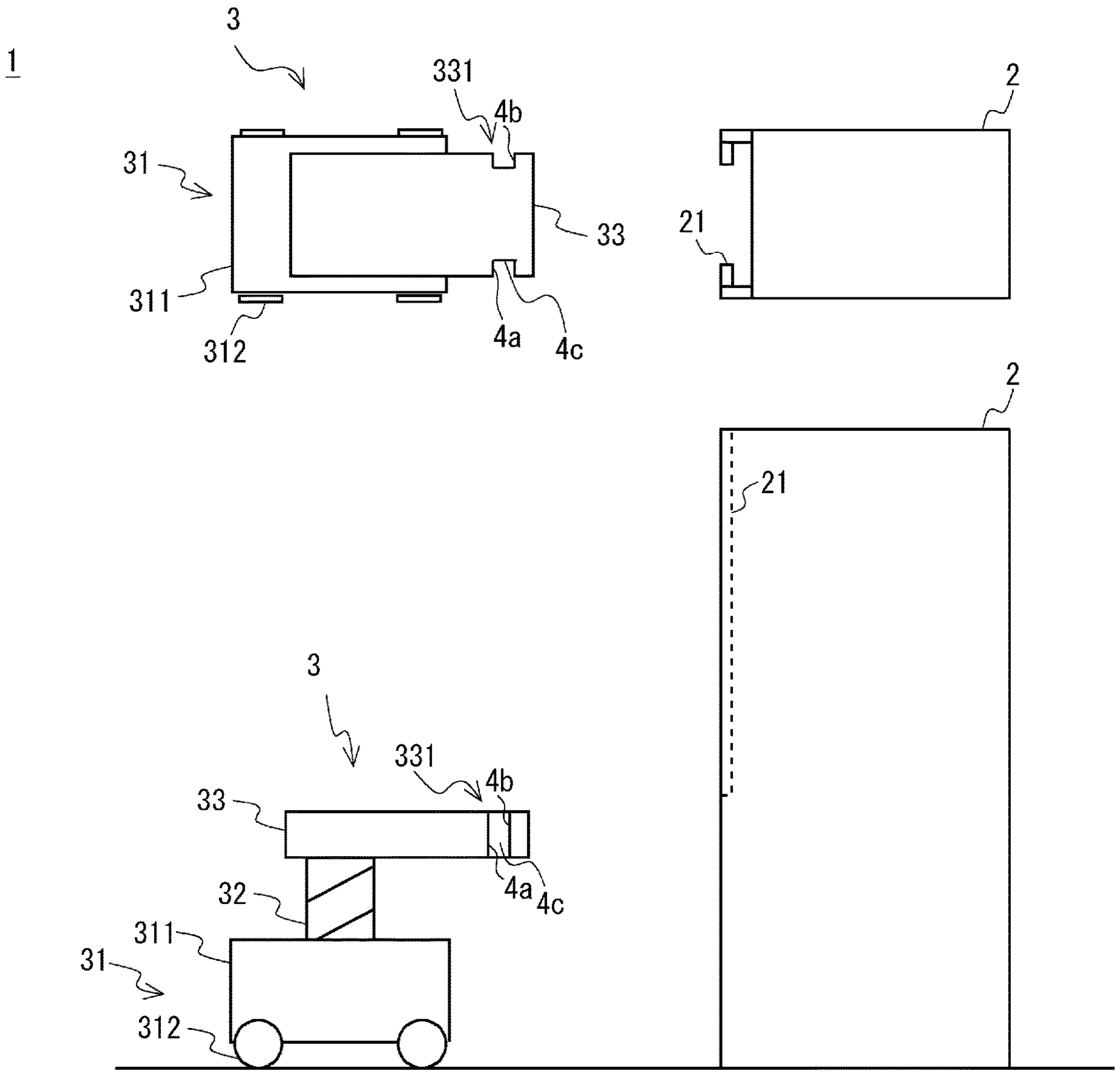
FIG. 1 is a diagram for explaining a configuration of a conveyance system according to a first embodiment.

Hereinafter, a conveyance system according to a first embodiment will be described with reference to the drawings. FIG. 1 is a diagram for explaining a configuration of a conveyance system 1 according to the first embodiment. A schematic top view is shown on the upper side and a schematic side surface view is shown on the lower side. The conveyance system 1 includes a post 2 and a conveyance robot 3.

The post 2 is a rack in which items (e.g., returnable boxes) are housed in a plurality of tiers. The post 2 includes a housing composed of a top plate, side plates, shelf plates, etc. The items are supported by the shelf plates. The shelf plate may have a gap through which an arm, which will be described later, passes. The part hidden by the top plate and side plates of the post 2 are indicated by dotted lines.

Guide rails 21 extending in the vertical direction are provided on a front surface, i.e., an opening surface, of the post 2. The guide rails 21 are, for example, plate-like members standing on a pair of side plates of the housing. A distance between the two guide rails 21 is wider than the width of the item taken in and out of the post 2. The item is taken in and out from between the two guide rails 21. A gap for the conveyance robot 3 to enter is provided between the lower end of the guide rails 21 and the ground.

The conveyance robot 3 includes a traveling unit 31, a lifting mechanism 32, and a mounting base 33.

The traveling unit 31 includes a mobile body main unit 311 and wheels 312 rotatably provided on the mobile body main unit 311. The traveling unit 31 also includes a motor (not shown) for rotatably driving the wheels 312. When the motor rotates the wheels 312 in response to a control signal, the mobile body main unit 311 moves to a specified position. Further, in a state where the guide rails 21 are fitted into grooves 331 described later, the traveling unit 31 may be driven, and side surfaces of the grooves 331 may be pressed against the guide rails 21.

The lifting mechanism 32 is provided on the mobile body main unit 311 to raise and lower the mounting base 33. The lifting mechanism 32 may be configured as a telescopic-type expansion and contraction mechanism that expands and contracts in the vertical direction.

The mounting base 33 may be provided at the tip of the lifting mechanism 32. An item is mounted on the mounting base 33. The grooves 331 are provided in the mounting base 33. The grooves 331 extend along the thickness direction of the mounting base 33. The grooves 331 are guided along the guide rails 21 of the post 2. The grooves 331 may be provided in the side surface on the left and the side surface on the right of the mounting base 33, respectively. The grooves 331 are designed to fit the guide rails 21. Typically, the width of the grooves 331 is designed to be slightly larger than that of the guide rails 21.

Each of the grooves 331 includes a side surface 4*a*, a side surface 4*b*, and a bottom surface 4*c*. The side surface 4*a* is referred to as a side surface on the rear side, and the side surface 4*b* is referred to as a side surface on the front side. The movement direction of the item carried out from the mounting base 33 is defined as a forward direction, and the direction opposite to the forward direction is defined as a rearward direction. That is, the direction in which the post 2 is present is defined as the forward direction, with the conveyance robot 3 as the reference.

The mounting base 33 may be provided with an arm (not shown). The arm extends in the horizontal direction in a state engaged with the item mounted on the mounting base 33, storing the item in the post 2. The item may move forward on the mounting base 33. In this way, the item on the mounting base 33 is carried out. The arm is contracted in the horizontal direction in the state engaged with the item stored in the post 2, and the item is transferred to the mounting base 33. The item may be moved in the rearward direction on the mounting base 33. This brings the item onto the mounting base 33. The arm may include a hook to engage with the item or a hand to hold the item. Transfer means (e.g., arm) for transferring the item may be provided on the post 2 rather than on the conveyance robot 3.

The mounting base 33 may be configured to be movable in the forward-rearward direction. In this case, the mounting base 33 is driven in the forward direction with the grooves 331 and the guide rails 21 fitted together, and the side surface 4*a* on the rear side of the mounting base 33 is pressed against the guide rail 21.

The conveyance robot 3 includes a control unit (not shown) for controlling the traveling unit 31 and the lifting mechanism 32. The control unit includes a processor, a memory, and the like. The functions of the control unit may be implemented by the processor reading a program into the memory and executing it.

By transmitting a control signal to each motor of the traveling unit 31, the control unit controls the rotation of the wheels 312 and moves the mobile body main unit 311 to a specified position. The control unit transmits a control signal to a rotating apparatus such as a motor constituting the lifting mechanism 32 to control the height of the mounting base 33 by expanding and contracting the expansion and contraction mechanism.

Further, by the control unit transmitting a control signal to an actuator (e.g., a mechanism for driving the mounting base 33 in the forward-rearward direction, the traveling unit 31), the side surface 4*a* on the rear side of each of the grooves 331 may be pressed against its corresponding guide rails 21. The center of gravity position of the conveyance robot 3 may be set in such a way that the side surfaces 4*a* are pressed against the guide rails 21. In this case, it is not necessary for the conveyance robot 3 to actively generate a force (referred to as a pressing force) to press the side surfaces 4*a* against the guide rails 21.

When taking the item in and out of the post 2, the conveyance robot 3 travels to a point where the grooves 331 are located directly beneath the guide rails 21. When the item is stored in the post 2, the item (not shown) is mounted on the mounting base 33. Then, the lifting mechanism 32 raises the mounting base 33. The guidance of the grooves 331 is started from the lower end of the guide rails 21.

The width of the grooves 331 is designed to be larger than the thickness of the guide rails 21. Therefore, there is a gap between each of the grooves 331 and its corresponding guide rail 21. As a result, in related art, there has been a risk of the mounting base 33 rattling and vibrating because of the gaps. Further, there has been a problem that, due to the presence of gaps between the grooves 331 and the guide rails 21, the position of the mounting base 33 may not be fixed, leading to a decrease in the accuracy of the position control of the mounting base 33.

In the conveyance system 1, the mounting base 33 is raised and lowered while pressing the side surfaces 4*a* on the rear side of the grooves 331 against the guide rails 21. This can reduce the rattling of the mounting base 33. In addition, the accuracy of the position control of the mounting base 33 is improved.

Figure 2:
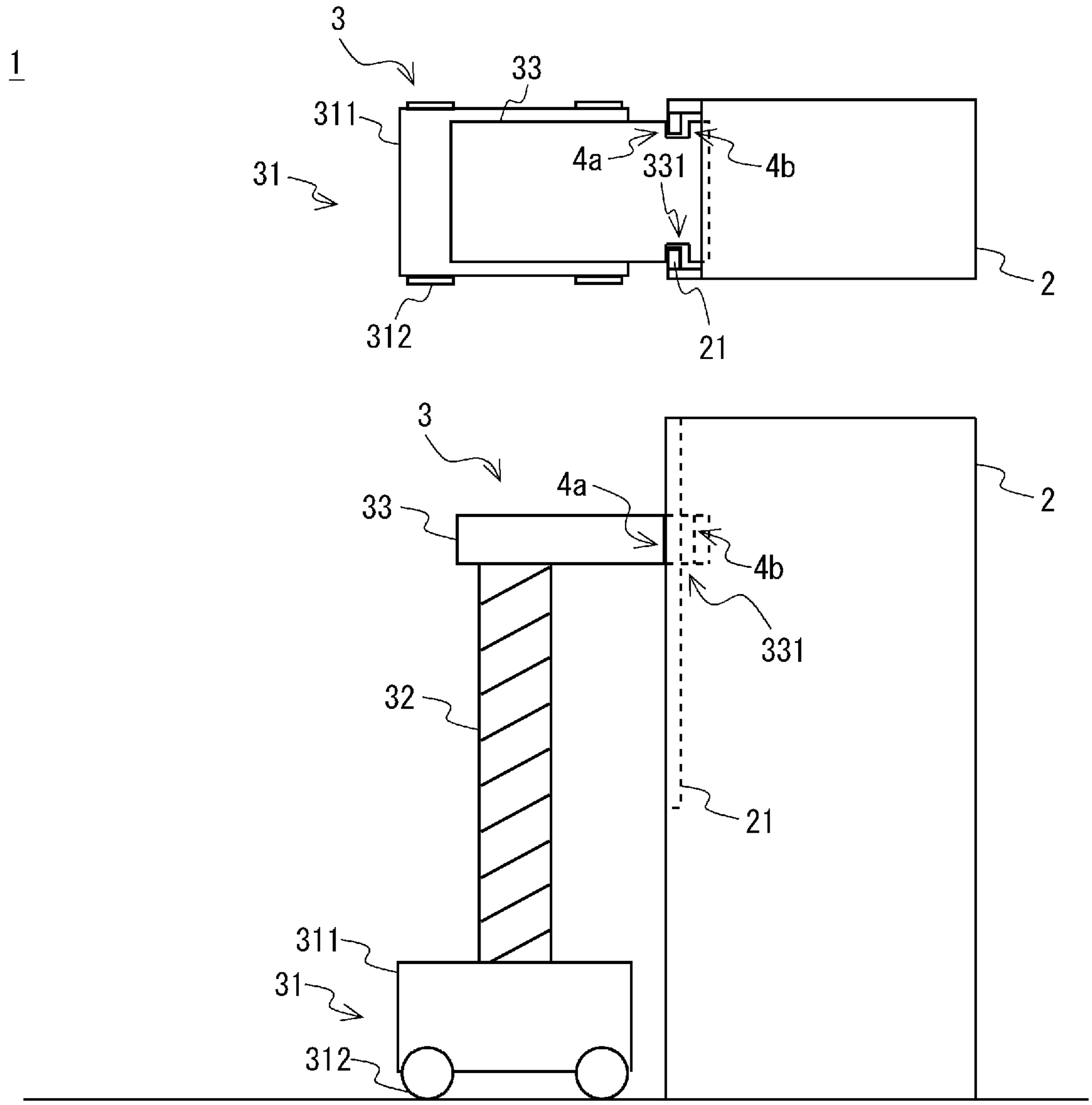
FIG. 2 is a diagram for explaining an operation of a conveyance system 1 according to the first embodiment.

FIG. 2 is a diagram for explaining the operation of the conveyance system 1. The side surfaces 4*a* on the rear side of the grooves 331 are pressed against the guide rails 21. When the item is carried out from the mounting base 33 and stored in the post 2, a moment is generated from the mounting base 33 to the post 2 around the proximal end (lower end) of the lifting mechanism 32. Since the side surfaces 4*a* on the rear side of the grooves 331 are in contact with the guide rails 21, a moment to cancel the above moment is generated. Therefore, the mounting base 33 is not rattled. The same applies when the item is moved from the post 2 to the mounting base 33.

If the height of the mounting base 33 is high, the pressing force may actually become small due to the deflection and rigidity of the lifting mechanism. Therefore, the higher the height of the mounting base 33, the greater the force exerted by the actuator in the conveyance system 1. The actuator is, for example, a motor that drives the traveling unit 31 or an actuator that translates the mounting base 33 in parallel.

When the weight of the item mounted on the mounting base 33 is large, the moment centered on the proximal end of the lifting mechanism 32 becomes large, and the pressing force may become too strong. Therefore, the control unit of the conveyance system 1 may reduce the force exerted by the actuator as the weight of item mounted on the mounting base 33 becomes larger.

If the pressing force is too strong, the load due to friction increases and vibration due to stick-slip occurs. On the other hand, if the pressing force is too weak, the desired effect cannot be achieved. Therefore, the control unit of the conveyance robot 3 may control the pressing force to fall within a predetermined range. The side surface 4*a* may be provided with a roller or a sliding material.

The side surface 4*a* of the mounting base 33 may be provided with a sensor (e.g., Limit Switch, Photoreflector), not shown, which detects that the side surface 4*a* is pressed against the guide rail 21. By confirming the detection result of the sensor, the side surface 4*a* can be securely pressed against the guide rail 21. Further, a sensor for measuring the magnitude of the pressing force may be provided.

It should be noted that it is not necessary for the side surfaces 4*a* to be pressed against the guide rails 21 from the moment when the guide rails 21 and grooves 331 start fitting. When the height is low, there is a possibility that the rattle may not occur, because the shaking of the mounting base 33 is small. In this case, the side surfaces 4*a* may be pressed against the guide rails 21 from the time when the height of the mounting base 33 reaches or exceeds a predetermined height. When the weight of the item is small, the shaking of the mounting base 33 may be small. Therefore, when the weight of the item mounted on the mounting base 33 is less than or equal to a predetermined value, the side surfaces 4*a* may not be pressed against the guide rails 21.

Figure 3:
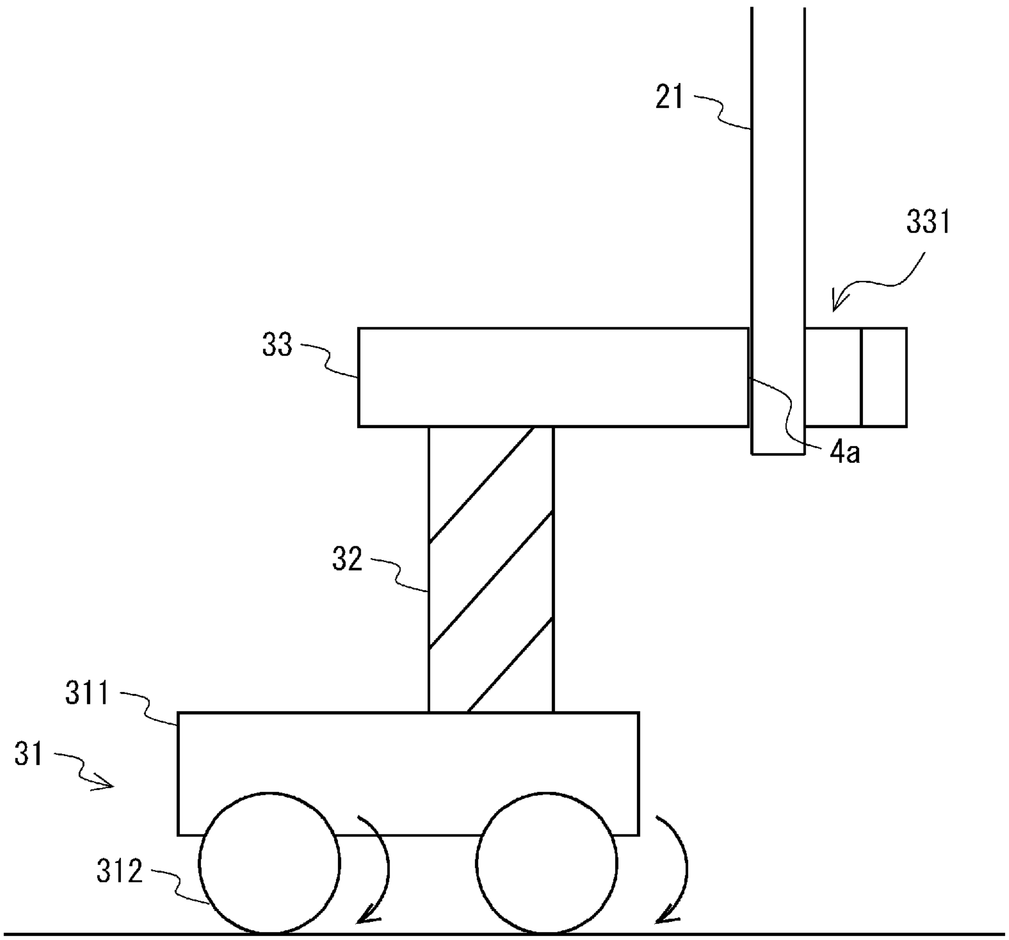
FIG. 3 is a diagram for explaining a specific example of a method in which the conveyance system according to the first embodiment generates a pressing force.

Next, with reference to FIGS. 3 to 6, a specific example of a method in which the conveyance system according to the first embodiment generates a pressing force will be described. FIG. 3 shows a method of pressing the side surfaces 4*a* against the guide rails 21 by controlling the drive of the traveling unit 31. The wheels 312 are driven in the direction indicated by the arrows. The traveling unit 31 is driven in the forward direction.

Figure 4:
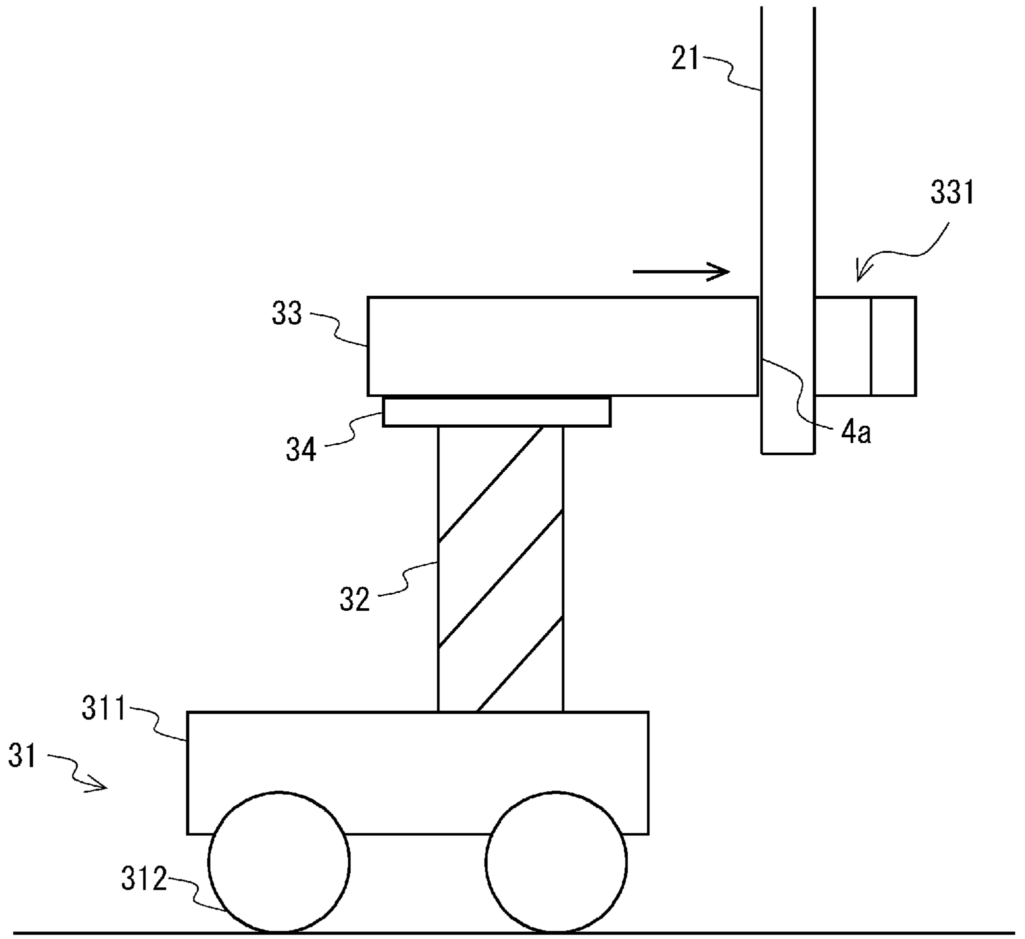
FIG. 4 is a diagram for explaining a specific example of a method in which the conveyance system according to the first embodiment generates a pressing force.

FIG. 4 shows a method of pressing the side surfaces 4*a* against guide rails 21 by sliding the mounting base 33 horizontally. A plate-like member 34 is attached to the tip of the lifting mechanism 32. The mounting base 33 is mounted to slide in the forward-rearward direction with respect to the plate-like member 34. The conveyance robot 3 includes a drive mechanism for slidably moving the mounting base 33. As indicated by the arrow, the mounting base 33 is driven in the forward direction, and the side surface 4*a* is pressed against the guide rails 21.

Figure 5:
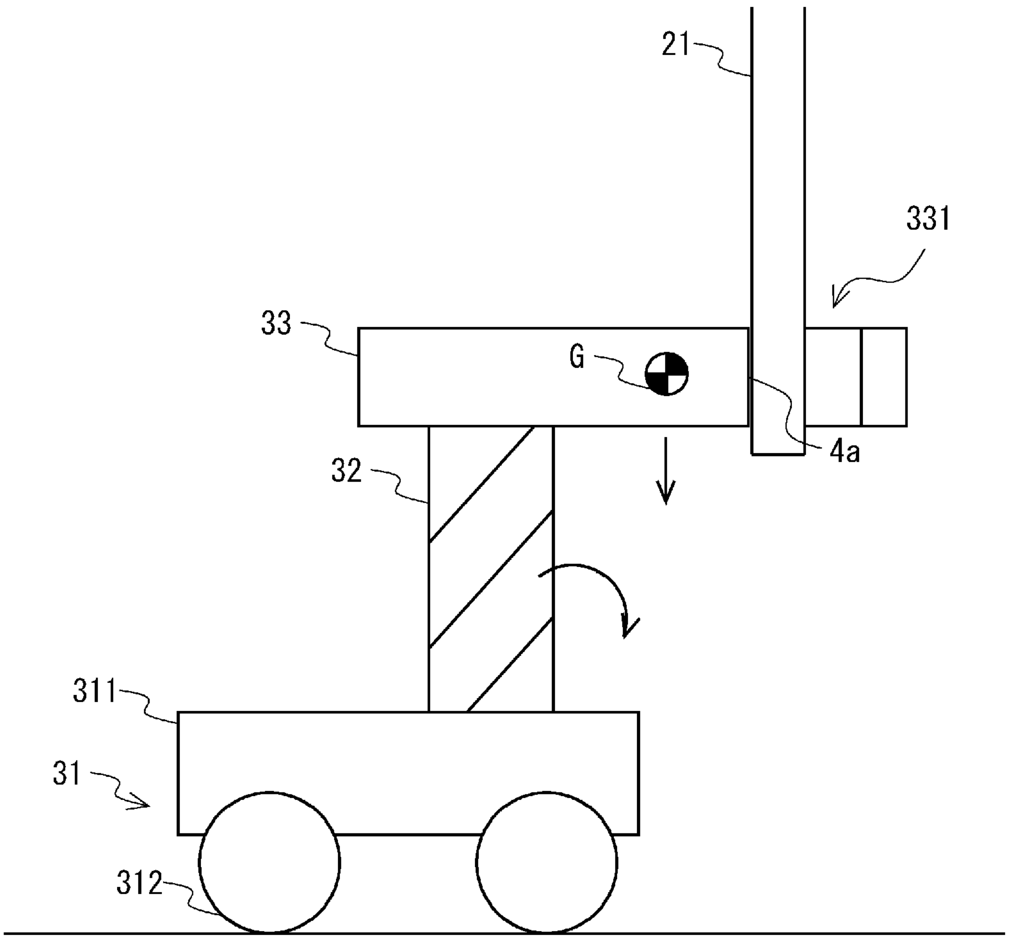
FIG. 5 is a diagram for explaining a specific example of a method in which the conveyance system according to the first embodiment generates a pressing force.

FIG. 5 shows a method of pressing the side surfaces 4*a* against the guide rails 21 by having the mounting base 33 lean on the guide rails 21. The center of gravity position of the mounting base 33 is positioned forward of the tip of the lifting mechanism 32. A symbol G indicates the center of gravity position.

Thus, as indicated by the arrows, a forward moment is generated around the proximal end of the lifting mechanism 32, and the side surfaces 4*a* of the grooves 331 are pressed against the guide rails 21. At this time, the conveyance robot 3 need not actively generate the pressing force.

Figure 6:
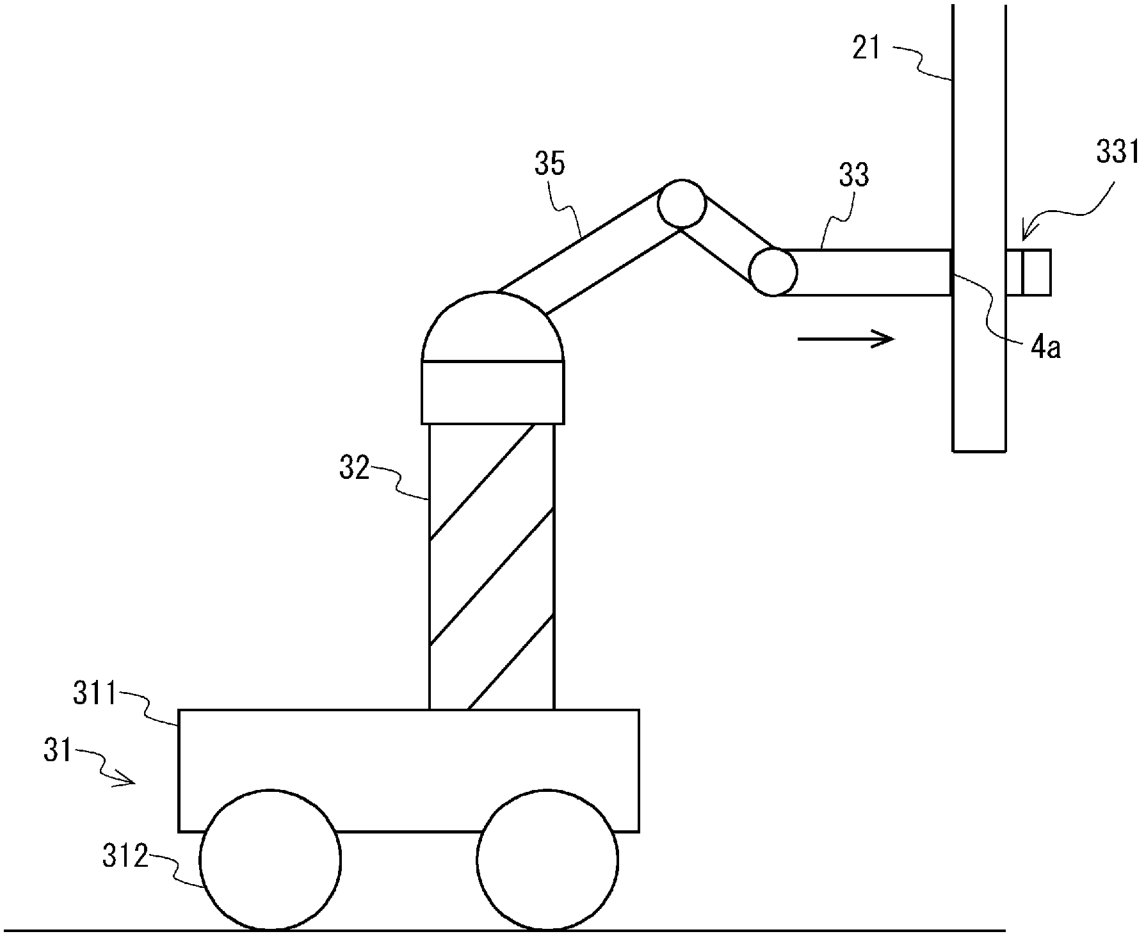
FIG. 6 is a diagram for explaining a specific example of a method in which the conveyance system according to the first embodiment generates a pressing force.

FIG. 6 shows a method of pressing the side surfaces 4*a* against the guide rails 21 using a robot arm. A robot arm 35 is attached to the tip of the lifting mechanism 32, and the mounting base 33 is provided at the tip of the robot arm 35. The robot arm 35 can move the mounting base 33 in the forward-rearward direction. As indicated by the arrow, the robot arm 35 drives the mounting base 33 forward, and the side surfaces 4*a* of grooves 331 are pressed against the guide rails.

The method of generating the pressing force is not limited to the examples shown in FIGS. 3 to 6. For example, a magnet may be provided on the side surface 4*a* or the guide rail 21 of the groove 331, and a magnetic pressing force may be used.

In the conveyance system according to the first embodiment, the stability of the mounting base can be improved to press the side surfaces on the rear side of the grooves in the mounting base against the guide rails.

The above-described program includes instructions (or software codes) that, when loaded into a computer, cause the computer to perform one or more of the functions. The program may be stored in a non-transitory computer readable medium or a tangible storage medium. By way of example, and not a limitation, non-transitory computer readable media or tangible storage media can include a random-access memory (RAM), a read-only memory (ROM), a flash memory, a solid-state drive (SSD) or other types of memory technologies, a CD-ROM, a digital versatile disc (DVD), a Blu-ray disc or other types of optical disc storage, and magnetic cassettes, magnetic tape, magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

It should be noted that the present disclosure is not limited to the above embodiments and may be modified accordingly to the extent that it does not deviate from the purpose.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A conveyance system comprising:

a mounting base with a groove guided along a guide rail extending in a vertical direction; and a lifting mechanism configured to raise and lower the mounting base, wherein when a direction of a movement of an item to be carried out from the mounting base is defined as a forward direction and a direction opposite to the forward direction is defined as a rearward direction, the mounting base is raised and lowered while pressing a side surface on a rear side of the groove against the guide rail, wherein the side surface on the rear side is pressed against the guide rail using an actuator, and the higher a height of the mounting base, the greater a force exerted by the actuator.

2. The conveyance system according to claim 1, wherein the heavier the item mounted on the mounting base, the smaller the force exerted by the actuator.

3. The conveyance system according to claim 1, further comprising a control unit configured to control the actuator in such a way that the force for pressing the side surface on the rear side against the guide rail falls in a predetermined range.

4. The conveyance system according to claim 1, further comprising a sensor configured to detect that the side surface on the rear side is pressed against guide rail.

* * * * *